United States Patent [19]

McCue et al.

[11] Patent Number: 5,324,703
[45] Date of Patent: Jun. 28, 1994

[54] METHOD OF PREPARATION OF GASOLINE VAPOR ADSORPTIVE ACTIVATED CARBON

[75] Inventors: John C. McCue, Covington, Va.; Zhiquan Q. Yan, Mt. Pleasant; Edward D. Tolles, Charleston, both of S.C.

[73] Assignee: Westvaco Corporation, New York, N.Y.

[21] Appl. No.: 95,755

[22] Filed: Jul. 21, 1993

Related U.S. Application Data

[63] Continuation-in-part of Ser. No. 929,166, Aug. 11, 1992, Pat. No. 5,250,491.

[51] Int. Cl.$^5$ .......................... B01J 39/12; B01J 20/20; B01D 53/02; C09C 1/44
[52] U.S. Cl. ..................................... 502/424; 95/146; 502/425
[58] Field of Search ............... 502/424, 425, 426, 427, 502/428; 95/146

[56] References Cited

U.S. PATENT DOCUMENTS

| | | | |
|---|---|---|---|
| 5,039,651 | 8/1991 | Kosaka et al. | 502/424 |
| 5,162,286 | 11/1992 | MacDowall et al. | 502/424 |
| 5,204,310 | 4/1993 | Tolles et al. | 502/424 |
| 5,206,207 | 4/1993 | Tolles | 502/424 |
| 5,250,491 | 10/1993 | Yah | 502/424 |

Primary Examiner—Paul E. Konopka
Attorney, Agent, or Firm—Terry B. McDaniel; Daniel B. Reece, IV; Richard L. Schmalz

[57] ABSTRACT

A method of manufacturing hard pelleted activated carbon is disclosed in which pellets are first formed by agglomeration in a pin mixer followed by pelleting the plasticized acid char (without the use of additional binders), and then activating the carbon pellets to yield a product with high density and activity.

16 Claims, No Drawings

METHOD OF PREPARATION OF GASOLINE VAPOR ADSORPTIVE ACTIVATED CARBON

CROSS REFERENCE TO RELATED APPLICATION

This application is a continuation-in-part of U.S. patent application Ser. No. 07/929,166 filed Aug. 11, 1992, now U.S. Pat. No. 5,250,491.

BACKGROUND OF THE INVENTION

1. Field of the Invention

The present invention relates to activated carbon and methods for preparing same. Particularly, this invention relates to the preparation of gasoline adsorptive activated carbons and their use in emission control canisters for gasoline powered vehicles. More particularly, this invention relates to activated carbon derived from lignocellulosic material prepared by chemical activation, agglomeration, and shaping of the agglomerated carbon.

2. Description of the Prior Art

L. Activated carbon is a microcrystalline, nongraphitic form of carbon which has been processed to increase internal porosity. Activated carbons are characterized by a large specific surface area typically in the range of 500–2500 m²/g, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped; gas-phase, vapor-adsorbent carbons are hard granules or hard, relatively dust-free shaped pellets. The present invention relates to shaped (pelleted), gas-phase vapor-adsorbent active carbons.

Generally, the larger the surface area of the activated carbon, the greater its adsorption capacity. The available surface area of activated carbon is dependent on its pore volume. Since the surface area per unit volume decreases as individual pore size increases, large surface area generally is maximized by maximizing the number of pores of very small dimensions and/or minimizing the number of pores of very large dimensions. Pore sizes are defined herein as micropores (pore width < 1.8 nm), mesopores (pore width = 1.8–50 nm), and macropores (pore width < 50 nm). Mesopores may be further divided between small mesopores (pore width = 1.8-5 nm) and large mesopores (pore width = <5-50 nm).

The liquid adsorptive capacity of the activated carbon relies primarily on large mesopores and macropores. As noted above, high macropore content normally is detrimental to the activated carbon's density characteristics, particularly if the activated carbon is derived from a lignocellulosic material. Microporosity, which may contribute to density, is detrimental to the liquid adsorbent effectiveness of the activated carbon, on a carbon volume basis.

The vapor adsorptive capacity of the activated carbon, on the other hand, relies primarily on micropores and small mesopores; whereas, the macropores reduce the density and can be detrimental to the vapor adsorbent effectiveness of the activated carbon, on a carbon volume basis. The adsorption capacity and rate of adsorption depend to a large extent upon the internal surface area and pore size distribution. Conventional chemically activated llanocellulose-based carbons generally exhibit macroporosity (macropore volume) of greater than 20% of the carbon particle total volume. Gas-phase activated carbon macroporosity of less than 20% of the carbon particle volume would be desirable. Likewise, a high percentage of mesoporosity (i.e., above 50% of total particle volume), particularly small mesoporosity, is desirable.

Due to environmental concerns and regulatory mandates, one of the largest single applications for gas-phase carbon is in gasoline vapor emission control canisters on automobiles. Evaporative emissions vented from both fuel tank and carburetor are captured by activated carbon.

Fuel vapors, vented when the fuel tank or carburetor is heated, are captured in canisters generally containing from 0.5 to 2 liters of activated carbon. Regeneration of the carbon is accomplished by using intake manifold vacuum to draw air through the canister. The air carries desorbed vapor into the engine where it is burned during normal operation. An evaporative emission control carbon should have suitable hardness, a high vapor working capacity, and a high saturation capacity. The working capacity of a carbon for gasoline vapor is determined by the adsorption-desorption capacity differential, by the volume of purge air which flows through the carbon canister, and by the extent to which irreversibly adsorbed, high molecular weight gasoline components accumulate on the carbon.

The ability to prepare an activated carbon of a higher density, higher hardness, and smaller median pore size from a material of a lower density, lower hardness, and large median pore size is taught in U.S. Pat. No. 4,677,086. An active granular wood-based carbon is ground to a fine powder, mixed with water and a bentonite clay binder, extruded to form cylindrical pellets, oven dried, and heat treated at 1,000° F. The uniform pellet form provides consistent particle size and a regular pellet shape which minimizes pressure drop in gas phase applications.

Also, U.S. Pat. No. 5,039,651 teaches densification of activated carbon product from cellulose materials including coconut shells, wood chips, and sawdust by pressing after initially heating to a relatively low temperature, followed by extrusion and calcination.

U.S. Pat. No. 5,206,207 discloses activated carbons of high activity and relatively high density suitable for solvent and vapor capture and recovery prepared by chemically activating carbonaceous material fragments (i.e., "discrete particles"), heat plasticizing the particles to begin transition to thermoset, densifying the particles by mechanical shaping (in a spheronizer), further heating the shaped particles to thermoset, and still further heating the thermoset shaped particles to 425°–650° C. Unfortunately, the spheronizing equipment limitations related to such process restrict capacity to below commercial production levels.

A more commercially feasible process of making activated carbons of high activity and relatively high density suitable for solvent and vapor capture and recovery is disclosed in co-pending (parent) U.S. patent application Ser. No. 07/929,166 which provides a chemical activation and agglomeration process for producing high activity gas-phase activated carbons without sacrificing density. While this process provides particles of fairly uniform size and shape, improvement in consistency of these characteristics is the primary object of the invention.

SUMMARY OF THE INVENTION

The above object of the invention is achieved and an improved high density carbon is prepared by the chemical activation of a carbonaceous material, preferably lignocellulosic material, with a chemical activation agent in a manner to produce a plastic intermediate product which is densified to effectively minimize the macropore structure of the activated carbonaceous material. The densified material is then formed into cylindrical pellets by extrusion to result in an improved active carbon pellet of increased hardness upon activation. Activation is accomplished by heating the pelleted material at a controlled rate, preferably to 450°–550° C.

An acid char is produced by the chemical activation of a carbonaceous material, preferably lignocellulosic material, with a chemical activation agent and then heated in a manner to produce an intermediate product which is subjected to shaping and densification by agglomeration in a high speed agglomeration device, such as a pin mixer, to effectively minimize the macropore structure of the activated carbonaceous material. (The acid char optionally may be pulverized in a separate step prior to agglomeration in the pin mixer, but such is not necessary as the early stage of the pin mixer effectively performs this function before the granular nature of the activated material is "reconstructed" by agglomeration to form a basically spheroidal shaped pellet in the later stage of the pin mixer. ) After initial pulverization, the pin mixer introduces a large amount of energy into the material that homogenizes the material and causes the material to become plastic and cohesive. The final shaping of the product is performed by extruding the heat treated material to form cylindrical pellets. Extrusion is followed by increasing the temperature of the product at a controlled rate to from about 400° C. to about 600° C., preferably about 450°–550° C., more preferably about 500° C. The extrusion step results in an increase in particle hardness (over non-extruded granular product) which is surprising and unexpected in view of the absence of binder material.

The novel high activity, high density gas-phase activated carbons produced are characterized by butane working capacities from above 15 to about 25 g/100 cm$^3$, preferably from about 17 to about 25 g/100 cm$^3$, and more preferably from about 19 to about 25 g/100 cm$^3$, a butane activity of from about 60 to about 80 g/100 g, preferably from about 65 to about 80 g/100 g, and more preferably from about 70 to about 80 g/100 g, and a density of from about 0 25 to about 0 40 g/cm$^3$, preferably from about 0.27 to about 0.40 g/cm$^3$, more preferably from about 0.30 to about 0.40 g/cm$^3$.

Preferably, such an activated carbon material also exhibits a mesopore content of greater than about 50%, preferably greater than about 60%, and more preferably greater than about 70%, based on the total particle volume, and a macropore content of less than 20%, preferably less than 18%, and more preferably less than 15%, based on the total particle volume.

DESCRIPTION OF THE PREFERRED EMBODIMENTS

Recently, a unique process for preparing granular activated carbon with high activity, high density has been developed as disclosed in co-pending U.S. patent application Ser. No. 07/929,166. The process includes preparing a plastic acid char, grinding the char into powder, shaping and densifying the char into granular particles by agglomeration, and activating the granules to produce high activity, high density, granular activated carbon. One particular method for producing the activated carbon product involves blending a 3:1-1:1 mixture respectively of a chemical activating agent, preferably phosphoric acid or zinc chloride, with a lignocellulose material, preferably wood chips, sawdust, or wood dust (or wood flour), with agitation for up to one hour at a temperature of from about 35° C. to about 95° C., after which the mixture is spread on a flat surface in layers of a thickness of from about 6 mm to about 25 mm. The mixture is subjected to a further heat treatment at a temperature of from about 35° C. to about 95° C. for a time sufficient that the mixture material goes through a transition from a highly plastic phase to begin to thermoset. Then the material is subjected to successive steps of pulverizing (if larger materials like wood chips or sawdust is the precursor) into fine particles and then re-agglomerating the particles to granular size and shape (generally spherical). Optionally, the shaped material may be heat treated again at from about 35° C. to about 120° C. to complete the densification by completing the thermosetting process. Upon complete elimination of plasticity, the temperature is gradually increased to from about 450° C. to about 600° C.

Typical product characteristics resulting from this prior process are shown in Table I.

TABLE I

| Activated Caron Product Characteristics | |
|---|---|
| Butane Working Capacity | 18.1 g/100 cm$^3$ |
| Butane Activity | 69.7 g/100 g |
| Surface Area | 2420 m$^2$/g |
| Apparent Density | 0.29 g/cm$^3$ |
| Particle Density | 0.48 g/cm$^3$ |
| Mesopore Content | 60% |
| Macropore Content | 12% |

The granular product of this method consists of particles with a relatively broad range of sizes which are normally screened to a narrower range (e.g., 10×25 mesh with 80 wt% yield) to accommodate particular applications.

In the present invention, an additional shaping step is employed before activation to reform granular particles of acid char into cylindrical pellets. This is accomplished by uniformly shaping the densified, re-agglomerated, spheroidal shaped, high density carbon by extrusion prior to activation. An advantage of pelletization is that the range of product particle size is narrow and there is a very high yield of product with the target size. In addition, particle size can be easily adjusted and large particle sizes can be produced which are much more difficult to make by other means. The benefit of large uniform particles is dramatically reduced pressure drop for packed bed applications. An additional benefit of the pelleted product, it was discovered, is the improved product hardness over the prior art granular particles.

A high-speed, energy intensive agglomeration process converts cooked acid char into a plastic, extrudable material for the pelleting step and no binders or lubricants are required to form pellets. The activated pelleted carbon is hard and exhibits high activity and high density. This process contrasts with the chemical activation process disclosed in U.S. Pat. No. 3,864,277 which employs binders in an extrusion step to form pellets.

The overall process of making high activity, pelleted activated carbon consists of five major process steps: forming the acid/sawdust blend, cooking, pin-mixing (or agglomerating), pelleting, and activating.

The raw material precursor in the invention chemical activation may be any of the carbonaceous material of plant or mineral origin earlier recited. Preferred precursors primarily are lignocellulosic materials of plant origin and include woodbased materials such as wood chips, wood flour, and sawdust, as well as nut pits and nut shells such as coconut shell. Chemical activation agents may include: alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Preferred among these are phosphoric acid and zinc chloride. Most preferred is phosphoric acid.

Acid/sawdust blending, cooking, and agglomeration steps can be performed as described in the previously referenced patent. It has been discovered that properly cooked and agglomerated acid char product has good extrudability and sufficient self-binding properties that it can be extruded or pressed to form cylindrical pellets without the use of additional binders, and that after activation, the pellets are mechanically strong and exhibit high adsorption activity. The success of the pelletization process depends upon attaining the correct degree of reaction during the cooking step and modifying the cooked char physically and chemically during the agglomeration step to yield a material which has the necessary plasticity for pelletization. A wide range of processing conditions has been employed to make cooked/agglomerated material which is satisfactory for this purpose. Without adding any binders, the acid char processed in a pin-mixer is pelleted while in the plastic condition, and the formed pellets, with or without an additional heat treatment (curing) step, is activated to obtain hard pelleted carbon with high density and high activity.

The activation typically occurs in a rotary kiln in which the temperature of the thermoset shaped mixture is raised to from about 450° C to about 600° C. Alternatively, for continuous processing, the cooking/activation may be accomplished on a belt oven. This basic process normally is followed with washing and drying steps.

In the following examples, the hardness of the granular product was determined by ASTM D3802-79 (ball pan hardness) procedure. The hardness of pellet carbon was determined by the Ford Strength test (known in the industry) which is a modified version of the original ASTM method specifically for 2 mm extruded carbons.

EXAMPLES

Cooking—Aqueous 85% phosphoric acid solution was blended with wet sawdust (for an acid:sawdust ratio of 1.6:1) in a mechanical mixer for 10 minutes at room temperature. The mixture was heated for 58 minutes in a continuous, belt oven (Aeroglide Corporation) at the following conditions: feed rate of 225 lb/hr, feed moisture of 28 wt%, gas temperature of 127° C,. air velocity of 140 FPM, humidity corresponding to a wet bulb temperature of 71° C. Product char moisture content was 7.9 wt% measured by a Cenco moisture balance.

Pin-mixing—The cooked char was ground in a hammer mill (Pulva Corporation) into fine powder with a mean particle diameter of about 177 microns (80 mesh) which was suitable for agglomeration in a pin-mixer. A pilot continuous pin-mixer (Mars Mineral Corporation) was used for initial shaping/densification at the following conditions:

TABLE II

| | Pin Mixing Process Conditions | | | | |
|---|---|---|---|---|---|
| Pin-mixer Run No. | Feed Rate lb/hr | Pin Speed RPM | Water Rate lb/hr | Nominal Particle Size | Moisture (Cenco) wt % |
| MMC#133D | 300 | 900 | 45 | minus 10 × 25 | 10.7 |
| MMC#133E | 300 | 900 | 48 | 10 × 25 | 10.8 |
| MMC#133F | 300 | 900 | 55 | 6 × 16 | 10.7 |
| MMC#133G | 300 | 900 | 60 | plus 6 × 16 | 10.2 |

Pelleting—Four pin-mixer product samples with different particle size distributions prepared from the above pin-mixer runs were immediately pelleted in a lab extrusion pelleter (Alexanderwerk AG, GA65 Granulator) at the following conditions: Pelleter Die 2.5 man diameter, speed 38 RPM, and feed rate 78 lb/hr. Pin-mixer product had a temperature of about 120° C. before the extrusion.

Activating—Activation of the granular char (without pelleting) and pelleted char was performed in a bench-scale, direct-fired rotary kiln by gradually raising the temperature to about 480° C. The screening yield of the on-sized granular product (10×25 mesh with mean particle diameter of 1.1–1.4 mm) varies in the range of 51% to 74%. The yield of 2 nun diameter pellet is about 95% due to its improved product uniformity. The properties of the activated carbon products are listed below:

TABLE III

| Comparison of Granular and Pelleted Carbon Properties | | | | |
|---|---|---|---|---|
| Sample ID | Butane Working Capacity (g/100 cc) | Butane Activity (g/100 g) | Apparent Density (g/cc) | Hardness (ASTM or Pellet Strength) |
| MMC#133D granular | 17.2 | 69.2 | .281 | 55 |
| MMC#133E granular | 17.1 | 63.4 | .295 | 56 |
| MMC#133F granular | 16.9 | 64.9 | .286 | 53 |
| MMC#133G granular | 16.8 | 58.9 | .301 | 52 |
| MMC#133D pelleted | 16.9 | 62.5 | .302 | 70 |
| MMC#133E pelleted | 17.0 | 63.5 | .298 | 69 |
| MMC#133F pelleted | 16.6 | 62.6 | .294 | 67 |
| MMC#133G pelleted | 16.5 | 60.6 | .299 | 63 |

The butane activity, BWC, and apparent density of the pelleted products are similar to the corresponding properties of the corresponding granular products. The "ASTM" hardness of the granular products is typical of granular carbons used in automotive applications. The "Pellet Strength" hardness of the pelleted carbon, measured by a different method (an industry standard test for pellet hardness), is substantially higher than the minimum acceptable hardness of 55. The pelleted carbon generally is more abrasion resistant than the granular carbon.

Table IV lists the surface area, density, and pore size distribution data for the above prepared activated carbons.

TABLE IV

| Sample ID | Surface Area m2/gm | Particle Density gm/ml | PERCENT OF PARTICLE VOLUME | | | |
|---|---|---|---|---|---|---|
| | | | >50 nm Macro | 5-50 nm Large Meso | 1.8-5 nm Small Meso | <1.8 nm Micro |
| MMC#133D Granular | 2525 | 0.487 | 11 | 7 | 55 | 12 |
| MMC#133E Granular | 2067 | 0.473 | 14 | 10 | 52 | 6 |
| MMC#133F Granular | 2243 | 0.474 | 15 | 11 | 55 | 7 |
| MMC#133G Granular | 2213 | 0.476 | 14 | 10 | 53 | 7 |
| MMC#133D Pelleted | 2141 | 0.47 | 16 | 8 | 51 | 7 |
| MMC#133E Pelleted | 2111 | 0.471 | 17 | 9 | 50 | 7 |
| MMC#133F Pelleted | 2114 | 0.464 | 17 | 10 | 51 | 6 |
| MMC#133G Pelleted | 2111 | 0.464 | 18 | 10 | 51 | 6 |

A standard determination of surface area of activated carbon usually is by the Brunauer-Emmet-Teller (BET) model of physical adsorption using nitrogen as the adsorptive. This was the method employed in calculating the invention carbon surface areas, based on nitrogen adsorption isotherm data in the range of 0.05 to 0.20 relative pressure.

In the case of granular activated carbon, the density is an important feature of the effectiveness of the adsorbent, as many applications of granular or shaped activated carbon involve a static active carbon bed of fixed volumetric size. The apparent density of the invention activated carbon is measured according to the method ASTM D 2854. Measurements of apparent density of granular carbon in a packed bed of particles reported herein were based on 10×25 mesh carbon materials. Measurements of apparent density of pelleted carbon in a packed bed of particles herein were based on pellets produced from a 2.5 mm die plate.

The density of the individual carbon particles was determined by displacement of mercury using a Micromeritics Pore Sizer 9300 instrument. The density is based on the mass of a particle and its volume including pores smaller than 35 micrometers.

Butane activity of the invention carbons was calculated by placing a weighed sample of the dry activated carbon, approximately 15 ml in volume, in a 1.45 cm diameter tube and admitting butane gas therein. The amount adsorbed at saturation at 25° C. is weighed and reported as butane activity in grams of butane per 100 grams carbon (g/100 g). The tube then is purged with air at 25C. at 250 ml/min. for 40 minutes, and the amount of butane removed is reported as butane working capacity (BWC) in grams of butane per 100 ml of carbon (g/100 cc). The carbon mass to volume conversion is made on the basis of the measured value of the carbon apparent density.

Porosity in pores larger than 50 nm (macroporosity) was determined using a Micromeritics Pore Sizer 9310 which measures the volume of mercury forced into pores under the influence of pressure. The distribution of pore volume with pore size is calculated using the Washburn equation, a standard model.

Porosity in pores smaller than 50 nm was determined using a Micromeritics DigiSorb 2600. Adsorption isotherm data for nitrogen, measured at a temperature of about 77 K is used with the Kelvin and Halsey equations to determine the distribution of pore volume with pore size of cylindrical pores according to the standard model of Barrett, Joyner, and Halenda. For the purposes of the examples and the invention claimed herein, macroporosity consists of pore diameters greater than 50 nm, mesoporosity consists of pore diameters of from 1.8 to 50 nm, and microporosity consists of pore diameters of less than 1.8 nm.

The foregoing method is capable of producing the invention high activity, high density activated carbon from relatively low density lignocellulose materials, such as wood chips, wood flour, and sawdust.

What is claimed is:

1. A method for producing high activity, high density activated carbon derived from lignocellulosic material comprising the steps of:
   (a) blending together fragments of the lignocellulosic material with a chemical activation agent selected from the group consisting of phosphoric acid and zinc chloride to produce an acid char;
   (b) heat treating the acid char to effect both plastization and drying of the acid char material to a moisture content of up to about 25% by weight;
   (c) densifying the heat-treated, acid char material by sequentially pulverizing the material into fine particles followed by re-agglomeration of the fine particles in the presence of moisture to form generally spherical shaped, high density carbon in a pin mixer;
   (d) shaping, by extruding, a mass of the reagglomerated, densified, spherical, high density carbon to produce an extrudate and cutting the extrudate to form pellets; and
   (e) activating the high density carbon pellets by heating gradually up to a final activation temperature of from about 400° C. to about 600° C., where the final shaped, high density carbon is characterized by a butane working capacity of from about 15 to about 25 g/100 cm$^3$ and a pore volume greater than 50% in pores from about 1.8 to about 50 nm in diameter and less than 20% in pores greater than 50 nm in diameter, based on total pore volume.

2. The method of claim 1 wherein the lignocellulosic material is selected from the group consisting of wood chips and sawdust.

3. The method of claim 1 wherein the ratio of chemical activating agent to lignocellulosic material is from 3:1 to 1:1, respectively.

4. The method of claim 3 wherein the ratio is 1.6:1.

5. The method of claim 1 wherein the blending of step (a) is conducted at from about 35° to about 95° C. for a period up to about one hour.

6. The method of claim 1 wherein the product of step (c) is subjected to a heat treatment of from about 35° to about 95° C. prior to activation.

7. The method of claim 1 wherein step (d) is conducted in the absence of a binder additive.

8. The method of claim 7 wherein steps (a)–(e) are conducted in the absence of a binder additive.

9. An improved method for preparing a high activity, high density activated carbon derived from lignocellulosic material comprising the steps of:

(a) blending together fragments of the lignocellosic material with a chemical activation agent selected from the group consisting of phosphoric acid and zinc chloride to produce an acid char;

(b) heat treating the acid char to effect both plastization and drying of the acid char material to a moisture content of up to about 25% by weight;

(c) densifying the heat-treated, acid char material by sequentially pulverizing the material into fine particles followed by re-agglomeration of the fine particles in the presence of moisture to form generally spherical shaped, high density carbon in a pin mixer; and (d) activating the high density carbon by heating gradually up to a final activation temperature of from about 500° to about 600° C. to produce a final shaped, high density carbon is characterized by a butane working capacity of from about 15 to about 25 g/100 cm$^3$ and a pore volume greater than 50% in pores from about 1.8 to about 50 nm in diameter and less than 20% in pores greater than 50 nm in diameter, based on total pore volume, wherein the improvement comprises increasing the hardness of the carbon by the intermediate step of uniformly shaping the densified, re-agglomerated, spherical shaped, high density carbon by extrusion prior to activation.

10. The method of claim 9 wherein the lignocellulosic material is selected from the group consisting of wood chips and sawdust.

11. The method of claim 9 wherein the ratio of chemical activating agent to lignocellulosic material is from 3:1 to 1:1, respectively.

12. The method of claim 11 wherein the ratio is 1.6:1.

13. The method of claim 9 wherein the blending of step (a) is conducted at from about 35° to about 95° C. for a period up to about one hour.

14. The method of claim 9 wherein the product of step (c) is subjected to a heat treatment of from about 35° to about 95° C. prior to activation.

15. The method of claim 9 wherein step (d) is conducted in the absence of a binder additive.

16. The method of claim 15 wherein steps (a)–(e) are conducted in the absence of a binder additive.

* * * * *